(No Model.)
H. D. MOELLER.
DRAFT EQUALIZER.
No. 418,529. Patented Dec. 31, 1889.
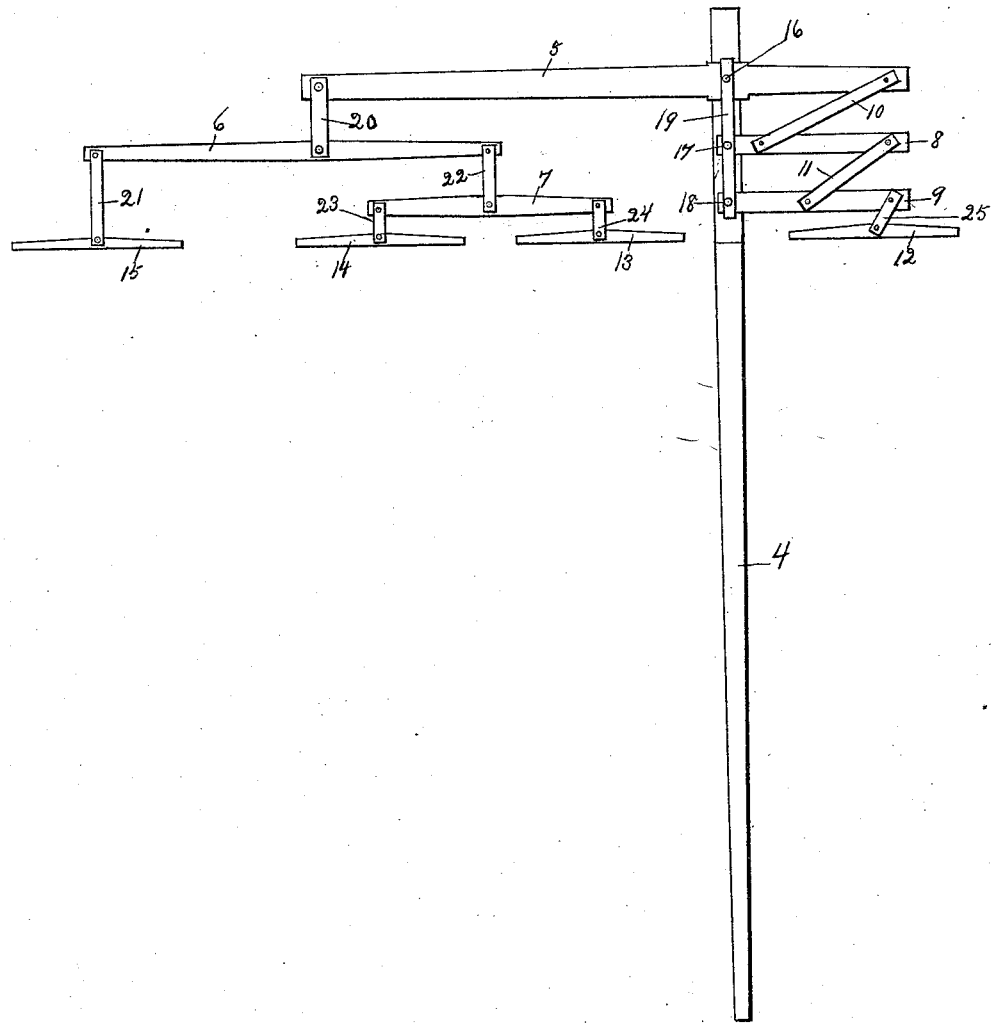
WITNESSES:
Louis G. Susemihl
Chas Hibbard
INVENTOR:
Herman D. Moeller
per Wm K White
Attorney

UNITED STATES PATENT OFFICE.

HERMAN D. MOELLER, OF MUSCATINE COUNTY, IOWA.

DRAFT-EQUALIZER.

SPECIFICATION forming part of Letters Patent No. 418,529, dated December 31, 1889.

Application filed August 26, 1889. Serial No. 321,999. (No model.)

*To all whom it may concern:*

Be it known that I, HERMAN D. MOELLER, a citizen of the United States, residing in the county of Muscatine and State of Iowa, have invented a new and useful Draft-Equalizer, of which the following is a specification.

My invention relates to draft-equalizers in which the draft-bar is attached to the tongue so as to extend at unequal lengths upon opposite sides of the tongue, the greater length of said bar having attached doubletrees and whiffletrees, and the opposite side of said tongue forward of said draft-bar provided with two short bars extended parallel with said draft-bar and connected by diagonal bars, and to which is attached a whiffletree; and the object of my invention is to equalize the draft of three animals hitched on one side of the tongue with the draft of one animal hitched upon the opposite side of said tongue. I accomplish this object by the mechanism illustrated in the accompanying drawing, in which the figure is a plan view of a tongue with my device attached.

4 is the tongue; 5, the draft-bar; 6, the doubletree; 7, the supplemental doubletree; 8 and 9, bars; 10 and 11, diagonal bars, and 12, 13, 14, and 15 whiffletrees.

The draft-bar 5 is attached to the upper surface of the tongue by a pivot-bolt 16, so it will extend at unequal lengths on opposite sides of the tongue, and the bars 8 and 9 at their inner ends are also attached to the upper surface of the tongue forward of the draft-bar by pivot-bolts 17 and 18. I prefer to use a bar 19 to rest on the upper surface of the draft-bar, and bars 9 and 10, having suitable perforations to accommodate the pivot-bolts 16, 17, and 18. One end of the diagonal bar 10 is loosely pivoted to the upper surface of the shorter length of draft-bar 5 near its outer end, and its opposite end is pivoted loosely to the upper surface of bar 8 near its inner end, and one end of the diagonal bar 11 is loosely pivoted to the upper surface of bar 8 near its outer end, and its opposite end is loosely pivoted to the upper surface of bar 9 about centrally. If desired, the diagonal bars 10 and 11 may be in pairs, one above and one below the surface of the draft-bar and bars 8 and 9, and held in position by a single pivot-bolt extended through the upper and lower diagonal bars at their respective ends. The doubletree 6 is attached to the outer end of the longer side of the draft-bar by the bar 20, loosely pivoted at its respective ends to said doubletree and draft-bar. The whiffletree 15 is attached to the outer end of the doubletree 6 by bar 21, loosely pivoted at its respective ends to said doubletree and whiffletree. The supplemental doubletree 7 is attached to the inner end of the doubletree 6 by the bar 22, loosely pivoted at its respective ends to said doubletrees. The whiffletree 14 is attached to the outer end of the supplemental doubletree 6 by a bar or link 23, and whiffletree 13 is attached to the inner end of such doubletree by a bar or link 24. The whiffletree 12 is connected with bar 9 near its outer end by the bar or link 25.

From the description given the mode of operation of my device may be readily understood.

What I claim as new, and desire to secure by Letters Patent, is—

The combination, with a tongue and a draft-bar pivotally attached thereto of unequal lengths on opposite sides of said tongue, and doubletrees and whiffletrees connected with such longer length of the draft-bar, of the bars 8 and 9, pivoted to said tongue, the diagonal bar 10, pivoted to said shorter length of the draft-bar and bar 8, the diagonal bar 11, pivoted to bars 8 and 9, the whiffletree 12, and the bar or link 25, connecting said whiffletree with said bar 9, substantially as described.

HERMAN D. MOELLER.

Witnesses:
LOUIS G. LUSEMIHL,
CHAS. L. HIBBARD.